United States Patent
Krutashov

[11] 3,804,218
[45] Apr. 16, 1974

[54] INERTIA SPEED SYNCHRONIZER

[76] Inventor: Anatoly Vasilievich Krutashov, Kuzminskaya ulitsa, 22, kv. 18, Moscow, U.S.S.R.

[22] Filed: Dec. 30, 1971

[21] Appl. No.: 214,230

[52] U.S. Cl.............................. 192/53 E, 192/53 F
[51] Int. Cl................................................ F16d 23/06
[58] Field of Search........................ 192/53 E, 53 F

[56] References Cited
UNITED STATES PATENTS

| | | | |
|---|---|---|---|
| 3,695,403 | 10/1972 | Eastwood | 192/53 E |
| 3,419,120 | 12/1968 | Stott | 192/53 F |
| 3,078,975 | 2/1963 | Eaton | 192/53 E |

Primary Examiner—Allan D. Herrmann
Attorney, Agent, or Firm—Eric H. Waters

[57] ABSTRACT

The synchronizer has a spline coupling in the disk part of which there are made through holes with interlocking faces. Passing through these holes are pins that carry a ring with a conical face interacting with the conical face of the meshing part of the gearbox. Formed on the pins are interlocking faces which at the moment of synchronization contact the interlocking faces of the coupling, and slots with fixing surfaces which interact with a springy element disposed aside of the disk of the coupling.

2 Claims, 4 Drawing Figures

INERTIA SPEED SYNCHRONIZER

The present invention relates to gearboxes, and more specifically to inertia synchronizers.

Inertia synchronizers made according to the present invention can be most advantageously employed in motor car gearboxes.

Known in the art are inertia speed synchronizers comprising a spline coupling which is capable of sliding relative to the gearbox shaft.

In the disk part of this coupling there are made holes with conical interlocking faces. Passing through these holes are pins at whose ends there are fixed rings having a conical face which interacts with the conical face of the mating part (gear), to equalize their peripheral speeds.

Made on each pin is a groove whose tapered side surfaces serve as the interlocking faces. These surfaces of the pins contact the interlocking faces of the coupling at the moment of synchronization.

Each pin has a circular slot made within the groove, and formed by the linked minor bases of the truncated cones. The taper surfaces of these cones serve as fixing faces.

Resting on these slots is a springy element (spring ring) which is mounted in a slit of the disk part of the spline coupling. Thus, axial displacement of the pin relative to the spline coupling is possible after overcoming the resistance of the springy element.

The pins carrying the rings with conical faces can freely move in the radial and circumferential directions within the range of the clearance between the pin and the walls of the hole made in the disk of the coupling (see, for example, a French Pat. No. 1,098,083, cl.F06f-B62d).

In the described inertia synchronizer the pins have a weakened cross section in the place of the slot, which reduces their stiffness. Location of the spring ring inside the disk of the coupling extends the width of the latter, and hence, the axial length of the inertia synchronizer.

It is an object of the present invention to raise the pin stiffness.

Another object of the present invention is to reduce the length of the synchronizer in the axial direction.

In accordance with the said and other objects, proposed herein in an inertia speed synchronizer, comprising a sliding spline coupling with holes made in its disk and having interlocking faces, through which holes there pass pins carrying at their ends a ring with a conical face intended to interact with the conical face of the mating part, said pins having deep interlocking faces that contact said interlocking faces of the coupling at the moment of synchronization, and also having slots with fixing side surfaces serving to interact with the contact sections of a springy element placed on said coupling. According to the invention, the slot in each pin is made on the side of contact with the springy element, while the fixing side surface of the slot is located between the interlocking face of the pin and the ring with the conical face that are disposed in the same direction of movement of the coupling, the contact sections of the springy element being located aside of the disk of the spline coupling.

In the case of a double-acting synchronizer the springy element should advisably consist of two spring rings mounted on either side of the disk of the coupling, and spaced apart a distance equaling the length of their traverse across the bottom of the slot, the depth of the latter being taken approximately equal to the depth of the interlocking faces of the pin.

Such a design provides for unobstructed movement of the spring rings across the bottom of the pin slot.

An inertia speed synchronizer made according to the present invention features high pin rigidity and a minimum axial length, which permits cutting the axial dimensions of the gearbox, and hence, reducing its weight.

Following is a description of a particular illustrative embodiment of the present invention with references to the accompanying drawings, wherein.

Figure 1:
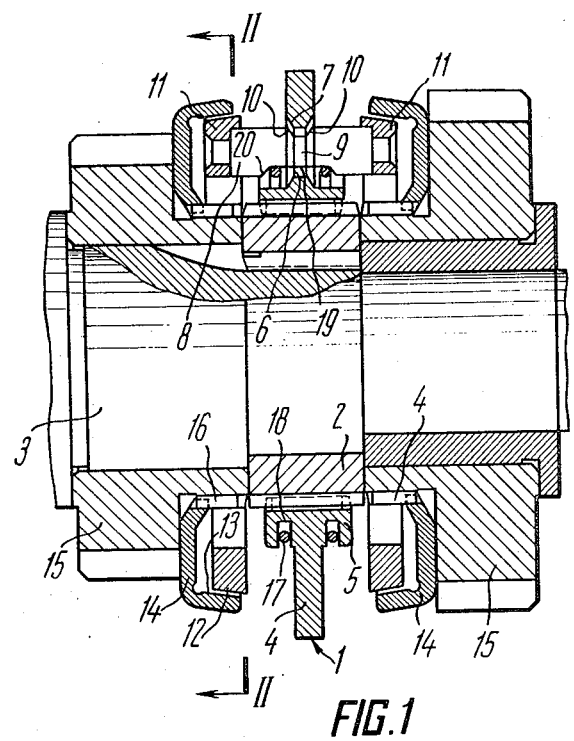
FIG. 1 is a longitudinal sectional view of a doubleacting inertia synchronizer according to the invention.

The double-action inertia synchronizer has a spline coupling 1 (FIG.1) seated in the splines of a hub 2 which is rigidly fixed on the gearbox shaft 3.

Coupling 1 consists of a disk part 4 and a splined part 5.

Made in the disk part 4 of coupling 1 are through holes 6 which at their edges are provided with conical interlocking faces 7.

Passing through said holes in the disk part 4 of coupling 1 parallel to shaft 3 are pins 8, each with a groove 9 made therein, the conical side faces 10 of the groove serving as interlocking surfaces contacting the interlocking faces 7 of coupling 1 at the moment of synchronization.

At the ends of pins 8 there are rigidly fixed rings 11 having conical faces 12 which interact with conical faces 13 of cups 14, the latter being fixed on constant-mesh gears 15 (the other gears and shafts of the gearbox are not shown in the drawing for the sake of its clarity).

Figure 2:
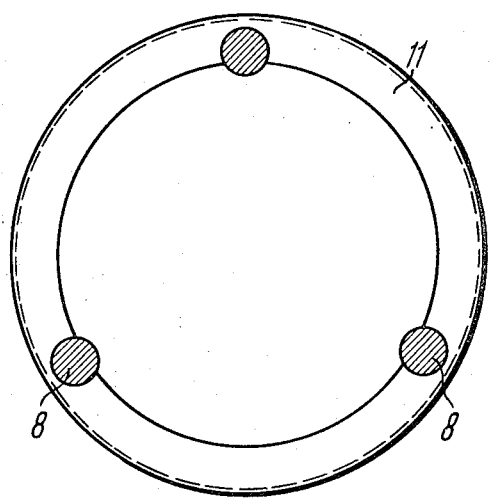
FIG. 2 is a section II—II in FIG. 1.

The mutual arrangement of pins 8 and ring 11 is shown in FIG.2.

Between the interlocking faces 10 and 7 in the neutral position there is provided a clearance, within the range of which pins 8 with rings 11 can freely move in the radial and peripheral directions. Gear 15 is capable of circular movement about shaft 3, and has a splined rim 16 which meshes with the splines of coupling 1 as the latter is moved to change the gear.

Placed on the splined part 5 of coupling 1 is a springy element 17 which is intended to fix pins 8 in neutral position and to shift them in the direction of movement of coupling 1.

In the double-acting synchronizer the springy element 17 consists of two spring rings placed in slits 18 of coupling 1 which are made on either side of disk 4.

The spring rings 17 rest on pins 8, for which purpose the latter have slots 19 made on the side of contact with the spring rings 17.

Each slot 19 has fixing side surfaces 20 serving to interact with the contact sections of the springy element 17.

Each mixing surface 20 of pin 8 is located between the interlocking face 10 of pin 8 and the ring 11 that are disposed in the same direction of movement of coupling 1.

Such location of the fixing surface 20 of pin 8 enables the springy element 17 to be positioned beyond disk 4 of coupling 1, thus securing minimum thickness of this part of the coupling and cutting the axial dimensions of the synchronizer.

The spring rings 17 are spaced apart a distance equaling the length of their shift across the bottom of slot 19, the depth of which equals the depth of the interlocking faces 10 of pin 8, for unobstructed movement of said rings across the slot.

Figure 3:
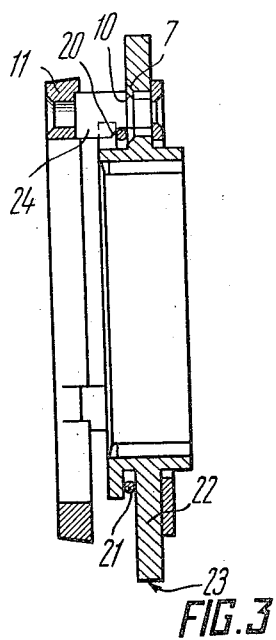
FIG. 3 is a longitudinal sectional view of a single-acting inertia synchronizer.

In the case of a single-acting inertia synchronizer, the springy element 21 (FIG.3) is disposed at one side of the disk part 22 of coupling 23 in the direction of its movement, and the pin 24 has one interlocking face 10 and one fixing surface 20. For the rest, the design of the synchronizer is similar to that described hereinbefore.

Figure 4:
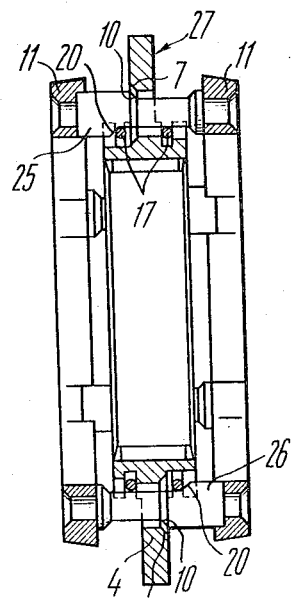
FIG. 4 shows an inertia synchronizer with two groups of pins: one for moving the coupling in one direction, and the other to move it in the opposite direction.

The double-acting inertia synchronizer can be made with two groups of pins 25, 26 (FIG.4), one of which causes the interlocking when coupling 27 moves in one direction, and the other when the coupling moves in the opposite direction.

The pins of this synchronizer are similar to those in the single-acting synchronizer.

For the rest, this design of the synchronizer is identical with the above-described double-acting synchronizer.

The inertia synchronizer operates as follows.

As coupling 1 (FIG.1) is shifted by the fork (not shown in the drawing), the spring ring 17 located in the direction of movement of coupling 1 presses on the fixing side surfaces 20 of pins 8 and shifts pins 8 with rings 11 to the value of clearance between the conical faces 12, 13 of the ring 11 and cup 14 disposed in the direction of movement. After the contact of the conical faces 12 and 13 the spring ring 17 through the respective fixing side surfaces 20 of pins 8 presses ring 11 against cup 14. In case of difference in the peripheral speeds of ring 11 and cup 14, a friction force is produced between their contacting faces 12 and 13, which entrains ring 11. Circumferential movement of ring 11 relative to coupling 1 continues untill the interlocking faces 7 and 10 come into contact, whereby a force is produced that prevents further shifting of coupling 1. From this moment on, the axial force from the fork (not shown) is transmitted by coupling 1 to ring 11 through the interlocking faces 7 and 10, and by causing friction between the contacting conical faces of ring 11 and cup 14 it equalizes their peripheral speeds, and the speeds of gear 15 and shaft 3. After the peripheral speeds of cup 14 and ring 11 are equalized and friction between their contacting faces 12 and 13 disappears, the obstructing force in the contact of faces 7 and 10 disappears as well, coupling 1 thus becoming capable of further axial displacement. The interlocking faces 7 slip over faces 10, and after faces 7 are completely off faces 10, pins 8 pass through holes 6 of coupling 1, and the spring ring 17 disposed in the direction of movement of coupling 1 compresses and jumps over the fixing side surfaces 20 of slots 19, slipping then across the cylindrical portion of pins 8. The second spring ring 17 slips across the bottom of slot 19, and the splines of coupling 1 mesh with the splined rim 16. The axial shift of coupling 1 stops when it abuts against cup 14.

When the gear is disconnected, coupling 1 moving towards the neutral position shifts rings 11, by means of spring rings 17, to the value of their total axial clearance, whereupon rings 11 with pins 8 stop. In the course of their further movement of coupling 1 the spring rings 17 slip across pins 8, and the splines of coupling 1 disengage the splined rim 16. In the neutral position each spring ring 17 locates at its respective fixing side surface 20.

What I claim is:

1. An inertia speed synchronizer, comprising: a coupling consisting of a disk part and a splined part; holes made in said disk part of the coupling; interlocking faces made on said disk part adjacent said holes; pins passing through said holes, each of said pins having interlocking faces sunk into the body of said pin, and contacting said interlocking faces of said disk of the coupling at the moment of synchronization; a ring fixed at the ends of said pins and having a conical face for interacting with the conical face of the mating component of the gear-box; a springy element having contact sections located aside of said disk of the coupling, and resting on said pins; slots made in said pins on the side of contact with said springy element; fixing side surfaces limiting said slot along the pin, and serving to interact with said contact sections of said springy element, said fixing surfaces being located between said interlocking face of the pin and said ring with a conical face disposed in the direction of movement of said coupling, said synchronizer being a double-acting synchronizer, the springy element comprising two spring rings mounted on either side of the disk of said coupling, and spaced apart a distance equaling the length of their traverse across the bottom of the slot, the depth of the latter being taken approximately equal to the depth of the latter being taken approximately equal to the depth of the interlocking faces of the pin.

2. An inertia speed synchronizer, comprising: a coupling consisting of a disk part and a splined part; holes made in said disk part of the coupling; interlocking faces made on said disk part adjacent said holes; pins passing through said holes, each of said pins having interlocking faces sunk into the body of said pin, and contacting said interlocking faces of said disk of the coupling at the moment of synchronization; a ring fixed at the ends of said pins and having a conical face; a member with a splined rim for engaging the splined rim of said coupling, and a conical face for interacting with the conical face of said ring; a springy element placed on said couplng and resting on said pins; slots formed in said pins only on the side of their contact with said springy element; fixing side surfaces limiting said slot along the pin and serving to engage said springy element, said fixing surfaces being located between said interlocking face of the pin and said ring with a conical face disposed in the direction of movement of said coupling.

* * * * *